US009234259B2

(12) United States Patent
Abe et al.

(10) Patent No.: US 9,234,259 B2
(45) Date of Patent: *Jan. 12, 2016

(54) PROCESS FOR RECOVERY OF COPPER FROM COPPER-CONTAINING CHLORIDE MEDIA

(75) Inventors: Yoshifumi Abe, Hitachi (JP); Hiroshi Hosaka, Hitachi (JP); Kazuaki Takebayashi, Hitachi (JP); Akira Yoshimura, Hitachi (JP); Takeshi Nakamura, Hitachi (JP)

(73) Assignee: JX NIPPON MINING & METALS CORPORATION, Tokyo (JP)

( * ) Notice: Subject to any disclaimer, the term of this patent is extended or adjusted under 35 U.S.C. 154(b) by 383 days.

This patent is subject to a terminal disclaimer.

(21) Appl. No.: 12/349,155

(22) Filed: Jan. 6, 2009

(65) Prior Publication Data

US 2010/0031779 A1  Feb. 11, 2010

(30) Foreign Application Priority Data

Aug. 11, 2008  (JP) ................................. 2008-207363

(51) Int. Cl.
*C22B 3/08* (2006.01)
*C22B 3/10* (2006.01)
*C22B 3/20* (2006.01)
*C22B 3/44* (2006.01)
*C22B 15/00* (2006.01)
*C22B 3/30* (2006.01)

(52) U.S. Cl.
CPC ............ *C22B 15/0069* (2013.01); *C22B 3/0017* (2013.01); *C22B 3/08* (2013.01); *C22B 3/10* (2013.01); *C22B 3/20* (2013.01); *C22B 3/44* (2013.01); *C22B 15/0071* (2013.01); *C22B 15/0089* (2013.01)

(58) Field of Classification Search
CPC .............. C22B 3/08; C22B 3/10; C22B 3/20; C22B 3/44; C22B 15/0069; C22B 15/0071; C22B 15/0089
USPC ............................................. 75/743; 210/634
See application file for complete search history.

(56) References Cited

U.S. PATENT DOCUMENTS

| 4,039,406 | A | * | 8/1977 | Stanley et al. ................. 205/580 |
| 4,594,132 | A | * | 6/1986 | Satchell, Jr. et al. .......... 205/581 |
| 4,971,662 | A | * | 11/1990 | Sawyer et al. ................. 205/581 |

(Continued)

FOREIGN PATENT DOCUMENTS

| AU | 42999/93 B | 1/1994 |
| AU | 669906 | 1/1994 |

(Continued)

OTHER PUBLICATIONS

Partial translation of Japanese Office Action issued in corresponding Japanese application No. 2008-207363.

(Continued)

*Primary Examiner* — George Wyszomierski
*Assistant Examiner* — Tima M McGuthry Banks
(74) *Attorney, Agent, or Firm* — Birch, Stewart, Kolasch & Birch, LLP

(57) ABSTRACT

A process for recovering copper from an acid aqueous solution containing cupric chlorides and alkali metal and/or alkali earth metal chlorides by a solvent extraction with a cation-exchange extractant, comprising the step of processing a solvent extraction in the presence of sulfate ions.

6 Claims, 1 Drawing Sheet

(56) References Cited

U.S. PATENT DOCUMENTS

| | | | |
|---|---|---|---|
| 5,431,788 A | 7/1995 | Jones | |
| 6,159,356 A | 12/2000 | Zoppi | |
| 6,706,186 B1* | 3/2004 | Nyman et al. | 210/634 |
| 7,842,120 B2* | 11/2010 | Abe et al. | 75/743 |
| 8,585,798 B2* | 11/2013 | Abe et al. | 75/744 |
| 2002/0004023 A1 | 1/2002 | Jones | |
| 2004/0047780 A1 | 3/2004 | Jones et al. | |
| 2009/0158894 A1 | 6/2009 | Haavanlammi et al. | |

FOREIGN PATENT DOCUMENTS

| | | |
|---|---|---|
| CA | 1105410 A | 7/1981 |
| CA | 2101514 A1 | 1/1995 |
| JP | 55-65332 A | 5/1980 |
| WO | WO 94/00606 A1 | 1/1994 |
| WO | WO 96/41026 A | 12/1996 |
| WO | 2004/059018 A1 | 7/2004 |
| WO | 2007/093666 A1 | 8/2007 |

OTHER PUBLICATIONS

Office Action dated Feb. 1, 2011 for Canadian Application No. 2,648,252.
US Office Action, dated Feb. 3, 2011, for U.S. Appl. No. 12/232,103.
US Office Action, dated May 31, 2011, for U.S. Appl. No. 12/232,103.
US Office Action, dated Oct. 6, 2011, for U.S. Appl. No. 12/349,155.
US Office Action, dated Sep. 1, 2010, for U.S. Appl. No. 12/232,103.

* cited by examiner

PROCESS FOR RECOVERY OF COPPER FROM COPPER-CONTAINING CHLORIDE MEDIA

TECHNICAL FIELD OF THE INVENTION

The present invention relates to a process for recovering copper from copper-containing chloride media, and more specifically, to a process for leaching copper from copper ores or copper concentrates and the like into the chloride media, and separating and recovering the copper dissolved in the chloride media by a solvent extraction.

BACKGROUND OF THE INVENTION

A leaching technique employing a sulfate media has been established as a hydrometallurgical technique for the recovery of copper from copper ores or copper concentrates and the like. Industrial-scale plants using the SX-EW process (combining solvent extraction and electrowinning) are in current commercial use.

The leaching of copper by sulfate media, however, is generally used for ores anchored by oxide ores. This technique is applied to only a part of a sulfide ore because of many problems it has, such as its low-rate reaction of leaching, impossibility of recovering precious metals and the like. Furthermore, in a copper concentrates wherein the grade of copper is improved by mineral processing and the like, the leaching of copper by the sulfate media is not practical, not only because of its low reaction rate but also because of its low leaching rate of copper and the difficulty of recovering precious metals.

Also, the above-described hydrometallurgical process is problematic in that it needs to be conducted at high temperatures and pressures to improve the leaching rate of copper. Therefore, a process of leaching copper from ores of sulfide by chloride media using an aqueous chloride solution has been developed, being a process which does not require high temperatures and pressures (Patent document 1). Patent document 1 discloses the process of electrowinning monovalent copper by leaching copper from the ores of sulfide as $Cu^+$ with a Cl—Br base acidic electrolyte that is produced by electrowinning of copper, has a high oxido-reduction potential, and includes $Cu^{2+}$. This process, however, involves a haloid (halex, typically $BrCl_2-$) that is difficult to treat in leaching and that is poisonous. Additional problems include an increase in cost for the reason that the copper produced by leaching with the chloride media needs refining because of its low grade and difficulty in control because of the complicated facilities which it necessitates.

To solve these problems, a process was developed which produces high grade copper by processing the copper concentrate and the like with chloride media, extracting copper ions from the chloride media into an organic solvent by solvent extraction, separating an organic phase from an aqueous phase, converting divalent copper extracted by contacting the organic phase with sulfuric acid to copper sulfate, and conducting electrowinning of copper by an existing sulfate media (Patent documents 2, 3). However, the extraction performance of copper is not be very high in this process, and there is no choice but to increase the amount of the solution treated in the process in order to increase the throughput of copper. As a result, the construction cost of a plant for carrying out that process is increased due to the scale of the facilities necessary to leach copper, and the operating cost is increased because the energy necessary to heat the solution is substantial. (Patent documents 2 and 3 were not yet open to the public on the filing date of the present application.

(Patent document 1) Australian Patent No. 669906 (Production of metals from minerals).
(Patent document 2) Japanese Patent Application No. 2008-84597.
(Patent document 3) Japanese Patent Application No. 2008-84934.

SUMMARY OF THE INVENTION

The present invention is directed to improve the extraction performance of copper in the solvent extraction of copper from the chloride media.

The inventors devoted themselves to make a study to solve the above problems and found out that the presence of the sulfate ions in the system of the solvent extraction can significantly improve the extraction performance of copper at the solvent extraction.

Therefore, the present invention is, in an aspect thereof, the process for recovering copper from the acid aqueous solution containing cupric chlorides and alkali metal and/or alkali earth metal chlorides by the solvent extraction with the cation-exchange extractant, comprising the step of processing the solvent extraction in the presence of the sulfate ions.

In an embodiment of the present invention, from about 10 to about 100 g/L of the sulfate ions are included in the acid aqueous solution.

In another embodiment of the present invention, the sulfate ions derive from a sulfate compound added to the acid aqueous solution.

In yet another embodiment of the present invention, a concentration of the chloride ions in the acid aqueous solution is from about 120 to about 200 g/L.

In yet another embodiment of the present invention, bromine ions exist in the acid aqueous solution.

In yet another embodiment of the present invention, a total concentration of the chloride ions and the bromide ions in the acid aqueous solution is from about 120 to about 200 g/L.

In yet another embodiment of the present invention, the cation-exchange extractant is an acidic chelate extractant.

In yet another embodiment of the present invention, the sulfate compound is at least one species selected from the group consisting of sodium sulfate, magnesium sulfate, calcium sulfate, potassium sulfate and ammonium sulfate.

In yet another embodiment of the present invention, the acid aqueous solution is prepared by the following processes,
1) leaching copper from copper ores or copper concentrates by a leaching solution containing cupric chloride and/or ferric chloride to make a post-leaching solution and residues,
2) and then separating the post-leaching solution from the residues by a solid-liquid separation.

In the present invention, the solvent extraction is carried in the presence of the sulfate ions. Therefore, it can be carried by a simple operation. For this reason, the extraction performance of copper by the solvent extraction can be improved without using particular equipments and agents.

And the amount of the solution treated in the leaching process can be reduced because of the increase of the extraction performance of copper. Therefore, the cost of the construction and the operating and the like can be reduced.

BRIEF DESCRIPTION OF DRAWINGS

FIG. 2 shows the step in which the present invention is applied in the process for recovering copper from copper ores, copper concentrates and the like.

DESCRIPTION OF THE PREFERRED EMBODIMENTS (Acid Aqueous Solution)

Figure 2:
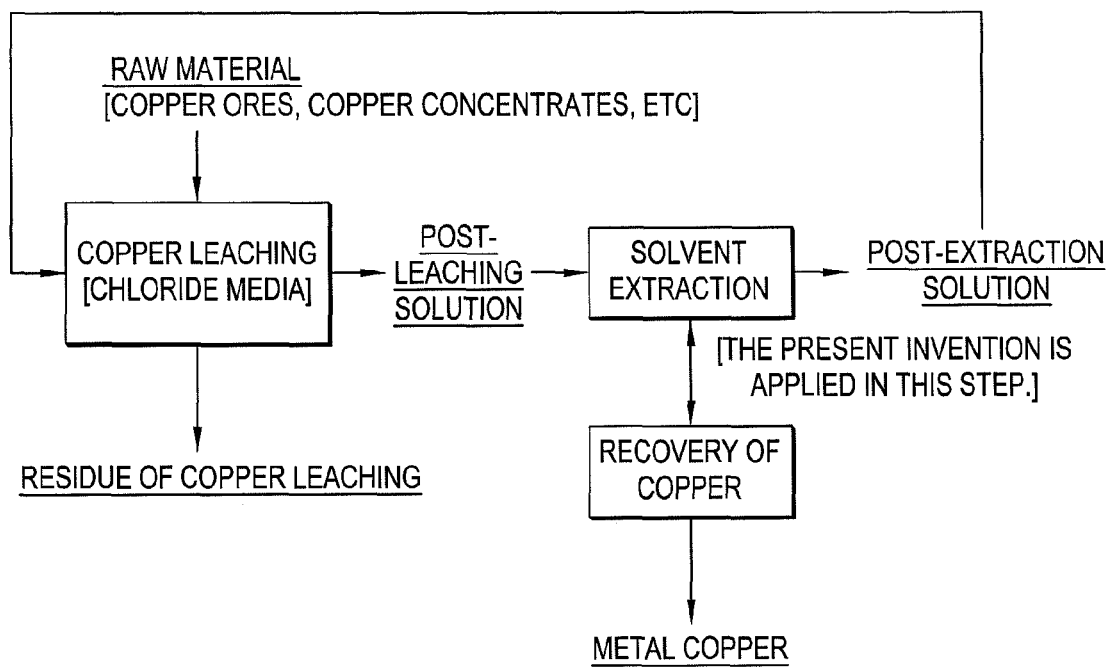

In the present invention, the copper which is a target of the solvent extraction has the form of chloride included in the acid aqueous solution. This is because the present invention typically targets the post-leaching solution leaching copper ores such as copper sulfide ores or copper oxide ores and copper concentrates in the chloride media containing cupric chloride and/or ferric chloride. FIG. 2 shows the step in which the present invention is applied in the process for recovering copper from copper ores, copper concentrates and the like. Copper which has the form of chloride in the acid aqueous solution can be cuprous chloride (CuCl) or cupric chloride ($CuCl_2$), and the copper is typically oxidized to cupric chloride after the step of leaching by the chloride media. In terms of the effective solvent extraction, it is preferably the cupric chloride. The concentration of copper in the acid aqueous solution is not limited, but it is preferably from about 10 to about 50 g/L, and more preferably from about 20 to about 30 g/L with the object of using it for a leaching agent in the leaching process of copper ores, copper concentrates and the like.

The acid aqueous solution typically includes the iron chloride. The solution leaching in the chloride media includes the iron chloride because iron is generally included in copper ores, copper concentrates and the like. The iron chloride is occasionally derived from an iron chloride (such as ferric chloride) used as the raw material in the chloride media. The iron chloride in the acid aqueous solution can be ferrous chloride ($FeCl_2$) or ferric chloride ($FeCl_3$). The concentration of iron in the acid aqueous solution is not limited, but it is typically from 0 to about 10 g/L.

The acid aqueous solution occasionally includes chlorides of alkali metal or alkali earth metal. It is because the chlorides of alkali metal or alkali earth metal are occasionally added to the chloride media as the raw materials in the chloride media used in the leaching process of copper ores, copper concentrates and the like. The chlorides of alkali metal or alkali earth metal are, such as, lithium chloride, sodium chloride, potassium chloride, rubidium chloride, cesium chloride, francium chloride, beryllium chloride, magnesium chloride, calcium chlorite, strontium chloride, barium chloride and radium chloride. They are typically sodium chloride, potassium chloride and calcium chlorite in the light of the cost of agents and the solubility. These chlorides of alkali metal or alkali earth metal may be included alone or by mixture in the acid aqueous solution.

The acid aqueous solution typically includes from about 120 to about 200 g/L of chloride ions in total, and more typically from about 120 to 180 g/L of chloride ions in total. As mentioned above, the target which the present invention typically intends is the post-leaching solution leaching copper ores such as copper sulfide ores or copper oxide ores and copper concentrates. It is because the chloride ion concentration is in the above mentioned coverage in the light of the effect of leaching. And the coverage is preferable because the extraction performance at the solvent extraction tends to lower if the chloride ion concentration is too high.

The acid aqueous solution occasionally includes bromine ions. It is because the bromine ions can lower the oxidation-reduction potential, accelerate the reaction, and reduce the time of leaching reaction of copper, and the bromine ions are occasionally included in the chloride media used in the leaching process. Although it is not restrictive, bromine ions are typically derived from bromides of alkali metal or alkali earth metal. In the case of containing bromine ions, a total concentration of the chloride ions and the bromine ions in the acid aqueous solution is typically from about 120 to about 200 g/L.

In the case of the leaching operation of copper ores or copper concentrates by the chloride media, the pH of the leaching solution is generally from about 1 to about 2. Therefore, although it is not restrictive, the pH of the acid aqueous solution in the present invention is also typically from about 1 to about 2. Furthermore, the above coverage of the pH is preferable because the extraction performance decreases if the pH decreases too much.

(Cation-Exchange Extractant)

The cation-exchange extractant can be used without restriction if it can extract copper from the acid aqueous solution. The chemical equation of extracting cupric chloride in the acid aqueous solution by the cation-exchange extractant is as follows.

$$CuCl_2 + 2HR \rightarrow CuR_2 + 2HCl \qquad (1)$$

HR: the cation-exchange extractant

The chemical equation (1) is an equilibrium reaction, and the extracted amount of copper depends on the concentration of HCl and $CuCl_2$ in the solution and depends on the concentration of the extractant in organic phase. It is presumable that a removal of HCl produced by the chemical equation (1) increases the extracted amount of copper.

The removal of HCl is generally processed by neutralization, but it accumulates cation chlorides comprising alkali used in the chemical equation (2) in the system.

$$nHCl + M(OH)n \rightarrow MCln + nH_2O \qquad (2)$$

M: Na, K, Ca, $NH_4$, and other.

It is needed to remove cation chlorides from the solution in order to restrain a reaction inhibition and a quality deterioration of productions by the accumulation of cation chlorides. It is presumable to bleed a part of the solution from the system as the waste process. However, it bleeds copper which is a valuable resource from the system at the same time. Therefore, there are costs for recovering and treating the solution.

In the present invention, the presence of sulfate ions in the system of the solvent extraction can increase the extracted amount of copper without the process of neutralization with alkali. The extraction performance depends on the concentration of the extractant and the like. However, according to the experimental result, the addition of about 10 g/L of sulfate ions increases the extraction performance by about 10% and the addition of about 80 g/L of sulfate ions increases the extraction performance by about 60%

The cation-exchange extractant is, for example, water-insoluble organic compounds containing carboxyl groups or hydroxyl groups, and in particular, carboxylic acid such as lauryl acid and naphthenic acid, alkyl phosphates such as 2-ethyl hexyl phosphoric acid (DEHPA), 2-ethyl hexyl phosphoric acid mono2-ethyl hexyl ester (EFPA•EHE), mono alkyl phosphoric acid, dialkyl phosphoric acid and alkyl pyrophoric acid.

However, the acidic chelate extractant is preferable as the cation-exchange extractant. The acidic chelate extractant is, such as aldoxime or extractants which have aldoxime as their main component, in particular, LIX84, LIX860 and LIX984 (name of commodities) available from Henkel Corporation prepared with 2-hydroxy-5-nonyl acetophenone oxime, 5-dodecyl salicyl aldoxime and 5-nonyl salicyl aldoxime, and Acorga (name of commodities) with 5-nonyl salicyl aldoxime.

These extractants are typically used after dilution by adding organic solvents which have paraffin hydrocarbons as their main components.

(Sulfate Ions)

Sulfate ions need to exist in the system at the solvent extraction of copper by contacting the acid aqueous solution with the cation-exchange extractant. As long as these conditions are satisfied, the timing of adding sulfate compounds is not restricted. Therefore, (i) it is possible to add sulfate compounds to either or both of the acid aqueous solution and the cation-exchange extractant before contacting the acid aqueous solution with the cation-exchange extractant, and (ii) it is possible to add sulfate compounds to the system at the same time as or after contacting the acid aqueous solution with the cation-exchange extractant. And it is possible to use sulfate ions produced by the oxidation of sulfur components included in the ores at leaching process of copper ores or copper concentrates and the like. However, it takes time to increase the concentration of sulfate ions to a predetermined numeric value because the amount of produced sulfate ions is small. Therefore, it is preferable to add sulfate compounds to the acid aqueous solution before contacting the acid aqueous solution with the cation-exchange extractant.

Sulfate compounds are not restricted as long as they can produce sulfate ions in the acid aqueous solution. The sulfate compounds are, such as sulfuric acid, sodium sulfate, magnesium sulfate, calcium sulfate, potassium sulfate, ammonium sulfate, copper sulfate and cobalt sulfate, and are preferably sodium sulfate, magnesium sulfate, calcium sulfate, potassium sulfate and ammonium sulfate in the light of cost of agents, solubility and the like.

It is preferable that the concentration of sulfate ions in the system at the solvent extraction is high. However, it needs to be determined with cost of agents, solubility and the like in mind. Therefore, the concentration of sulfate ions is preferably from about 10 to about 100 g/L, more preferably from about 20 to about 80 g/L, further preferably from about 40 to about 80 g/L with high regard for the extraction performance.

(Solvent Extraction)

Steps of the process of the solvent extraction may accordance with ordinary procedures. For example, the steps of the process comprise of contacting the acid aqueous solution (aqueous phase) with the cation-exchange extractant (organic phase), typically stirring to combine them, and reacting copper ions with extractants. The solvent extraction is preferably processed at room temperature (for example about 15 to about 25° C.) to about 60° C. and under the atmosphere pressure in the light of restraining a quality deterioration of the extractants. After that, the aqueous phase and the organic phase are separated by the difference in specific gravity with the use of a settler. The aqueous phase after the extraction can be repeatedly used as the leaching solution of copper ores, copper concentrates and the like. Copper extracted into the organic phase is simply rinsed out and inversely extracted by sulfuric acid. This process leads to the production of the copper sulfate solution. Electrolytic copper can be produced by the electrolysis of the copper sulfate solution. The organic phase removed copper can be repeatedly used in the solvent extraction.

EXAMPLES

Working examples of the present invention are as follows, and the present invention is not to be considered limited to what is shown in the following examples.

Working Example 1

The solution containing cupric chloride in a copper concentration of 30 g/L, ferric chloride in a iron concentration of 2 g/L, cupric chloride, iron chloride and sodium chloride in a total chloride ion concentration of 120 g/L or 200 g/L, and sodium sulfate in a sulfate ion concentration of 0 g/L and 50 g/L was produced as the acid aqueous solution (the pre-extraction solution) (pH: 1.5 to 1.9). And LIX984 was diluted by IsoperM to 30 vol. % to prepare the cation-exchange extractant.

The pre-extraction solution and the extractant were combined at the O/A rate 1 in volume and stirred at room temperature under an atmospheric pressure for 5 minutes, and left at rest for 15 minutes for the separation. After separating, the copper concentration of the aqueous phase (the post-extraction solution) was measured. Table 1 shows the results.

TABLE 1

| pre-extraction solution | | | post-extraction solution | organic phase after extraction Cu (calculated value) | increase rate of extraction performance ※ |
|---|---|---|---|---|---|
| Cl g/L | $SO_4^{2-}$ g/L | Cu g/L | Cu g/L | g/L | % |
| 120 | 0 | 30.3 | 20.0 | 10.3 | — |
| 120 | 50 | 30.7 | 18.0 | 12.7 | 123 |
| 200 | 0 | 29.2 | 24.4 | 6.9 | — |
| 200 | 50 | 29.2 | 18.9 | 10.3 | 149 |

※ The rates are calculated on the basis of 0 g/L of the sulfate ion concentration in each system.

As shown in the working example 1, the extraction performance of the solution added sulfate ions was higher than that added no sulfate ions in each system. In each system, assuming that the extraction performance of the solution of 0 g/L of sulfate ion concentration is 100%, the extraction performance of the solution added sulfate ions increased to 123% in the system of 120 g/L of the chloride ion concentration, and increased to 149% in the system of 200 g/L of the chloride ion concentration.

This shows that the extraction performance of the cation-exchange extractant in the chloride media easily increases in the presence of sulfate ions.

Working Example 2

The solution containing cupric chloride in a copper concentration of 30 g/L, ferric chloride in a iron concentration of 2 g/L, cupric chloride, iron chloride and sodium chloride in a total chloride ion concentration of 180 g/L, sodium bromide by bromine ion concentration of 22 g/L, and sodium sulfate in a sulfate ion concentration of 0 to 80 g/L was produced as the acid aqueous solution (the pre-extraction solution) (pH: 1.6). And LIX984 was diluted by IsoperM to 30 vol. % to prepare the cation-exchange extractant.

Figure 1:
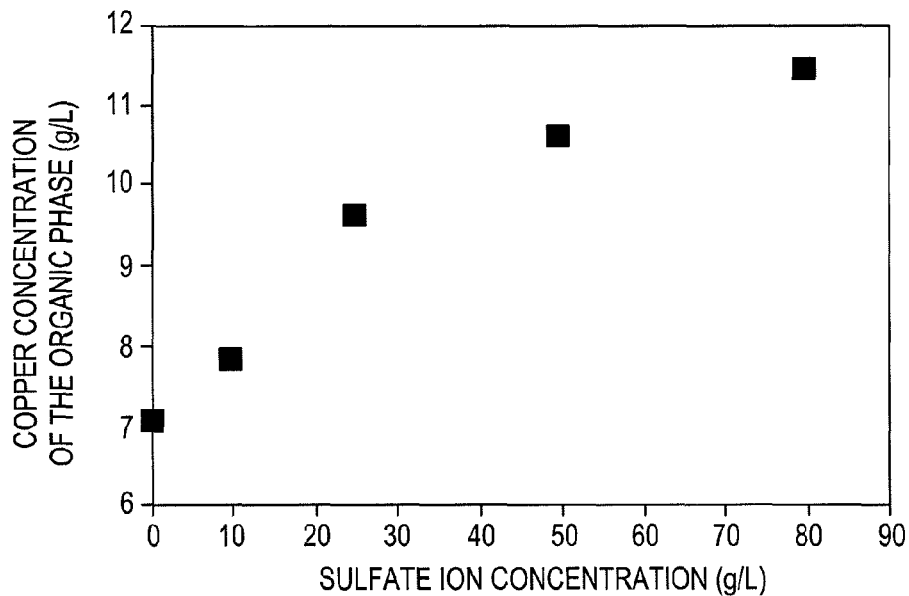
FIG. 1 shows the effects of the sulfate ion concentration on the extraction performance of copper on the basis of the result of the working example 2.

The pre-extraction solution and the extractant were combined at the O/A rate 1 and stirred at room temperature under an atmosphere pressure for 5 minutes, and left at rest for 15 minutes for the separation. After separating, the copper concentration of the aqueous phase (the post-extraction solution) was measured. Table 2 and FIG. 1 show the results.

TABLE 2

| pre-extraction solution | | post-extraction solution | organic phase after extraction Cu | extraction |
|---|---|---|---|---|
| $SO_4^{2-}$ g/L | Cu g/L | Cu g/L | (calculated value) g/L | performance rate % |
| 0.0 | 30.3 | 23.3 | 7.0 | 100.0 |
| 10.0 | 29.8 | 22.0 | 7.8 | 111.5 |
| 25.0 | 31.9 | 22.3 | 9.6 | 137.1 |
| 50.0 | 28.9 | 18.3 | 10.6 | 151.4 |
| 80.1 | 28.7 | 17.3 | 11.4 | 162.9 |

(0040) As shown in the working example 2, when the sulfate ion concentration is 0 g/L, the copper concentration of the organic phase after extraction is 7.0 g/L. As the sulfate ion concentration increases, the copper concentration of the organic phase after extraction increases. When the sulfate ion concentration is 80 g/L, the copper concentration of the organic phase is 11.4 g/L.

As shown above, assuming that the extraction performance of the solution of 0 g/L of sulfate ion concentration is 100%, the extraction performance of the solution of 80 g/L of sulfate ion concentration increased to about 160%.

These show that the extraction performance depends on the additive amount of sulfate ions, the sulfate ions have an effect on the extraction performance of the cation-exchange extractant, and the extraction performance of the cation-exchange extractant increases in the system of the chloride media containing bromine ions just like the system of the working example 1 which includes only the chloride ions.

Working Example 3

The solution containing cupric chloride by copper concentration of 20 g/L, ferric chloride by iron concentration of 2 g/L, cupric chloride, hydrochloric acid and iron chloride by total chloride ion concentration of 180 g/L, and sodium bromide by bromine ion concentration of 22 g/L was produced as the leaching solution. Hydrochloric acid was added as an oxidant at the raw material leaching. Copper concentrates which had the weight composition of Cu:22%, Fe:24% and S:27% were crushed to the grain size of P80 (18 µm) and the particles were used as raw materials. LIX984 was diluted by IsoperM to 20 vol. % and used as the extractant. The mixer settler was used as the extraction reactor vessel. The extraction solvent comprised the aqueous phase and the organic phase by the O/A rate 1.5.

The aqueous phase (the post-extraction solution) was returned to the leaching step for raw materials and repeatedly used as the leaching solution. The organic phase after extraction was stripping by 180 g/L of sulfuric acid, and repeatedly used after removing copper. The weight of raw materials introduced in the reused leaching solution was adjusted to be the same as the weight of copper extracted in the extracting step.

In this way, the raw material leaching and the solvent extraction of copper were repeated, and checked a transition of the extraction performance. Table 3 shows the results of the working example 3.

TABLE 3

| repeat count | pre-extraction solution (post-leaching solution) | | post-extraction solution | organic phase after extraction Cu |
|---|---|---|---|---|
| | $SO_4^{2-}$ g/L | Cu g/L | Cu g/L | (calculated value) g/L |
| 1 | — | 24.4 | 18.0 | 4.3 |
| 10 | 11.0 | 26.7 | 19.3 | 5.0 |
| 20 | 18.0 | 26.6 | 18.9 | 5.1 |
| 30 | 18.0 | 28.1 | 19.3 | 5.9 |
| 40 | 20.0 | 29.7 | 19.1 | 7.0 |
| 50 | 26.0 | 29.8 | 19.0 | 7.2 |

This working example shows that the sulfate ion concentration before and after extraction gradually increases as the repeat count increases.

The copper ion concentration of the organic phase after extraction also increases as the concentration of sulfate ions increases. This shows that even though the sulfate ions are not added in the solution as reagents but are produced in the transuding step, the extraction performance of the solution increases.

What is claimed is:

1. A process for recovering copper from an acid aqueous solution containing cupric chlorides, bromine ions, and alkali metal and/or alkali earth metal chlorides by a solvent extraction with a cation-exchange extractant, comprising the step of processing a solvent extraction in the presence of sulfate ions, wherein from about 10 to about 100 g/L of the sulfate ions are included in the acid aqueous solution, wherein the acid aqueous solution is prepared by the following process:
    producing a leaching solution comprising bromine ions, alkali metal and/or alkali earth metal chlorides, and cupric chloride and/or ferric chloride;
    1) leaching copper from copper ores or copper concentrates with the leaching solution to make a post-leaching solution and residues;
    2) and then separating the post-leaching solution from the residues by a solid-liquid separation to obtain the acid aqueous solution.

2. The process of claim 1, wherein the sulfate ions derives from a sulfate compound added to the acid aqueous solution.

3. The process of claim 2, wherein the sulfate compound is one or more species selected from the group consisting of sodium sulfate, magnesium sulfate, calcium sulfate, potassium sulfate and ammonium sulfate.

4. The process of claim 1, wherein a concentration of the chloride ions in the acid aqueous solution is from about 120 to about 200 g/L.

5. The process of claim 1, wherein a total concentration of the chloride ions and the bromide ions in the acid aqueous solution is from about 120 to about 200 g/L.

6. The process of claim 1, wherein the cation-exchange extractant is an acidic chelate extractant.

* * * * *